United States Patent
Piper et al.

(10) Patent No.: US 7,334,104 B2
(45) Date of Patent: Feb. 19, 2008

(54) SATISFYING MEMORY ALLOCATION REQUESTS FROM MEMORY POOL OR LOOKASIDE LISTS BASED ON MEMORY SIZE REQUESTED TO BE ALLOCATED

(75) Inventors: Scott A. Piper, Bothell, WA (US); Vikas Ahluwalia, Kirkland, WA (US); Vipul Paul, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 10/993,783

(22) Filed: Nov. 20, 2004

(65) Prior Publication Data
US 2006/0112254 A1    May 25, 2006

(51) Int. Cl.
G06F 12/00    (2006.01)
(52) U.S. Cl. ........................ 711/170; 711/171
(58) Field of Classification Search ................ 711/170, 711/171
See application file for complete search history.

(56) References Cited

U.S. PATENT DOCUMENTS

| | | | | |
|---|---|---|---|---|
| 5,109,336 | A * | 4/1992 | Guenther et al. | 711/171 |
| 5,675,790 | A | 10/1997 | Walls | |
| 5,978,893 | A * | 11/1999 | Bakshi et al. | 711/171 |
| 6,070,202 | A * | 5/2000 | Minkoff et al. | 710/56 |
| 2003/0084276 | A1* | 5/2003 | Levidow et al. | 713/1 |
| 2004/0255210 | A1* | 12/2004 | Peretz et al. | 714/718 |
| 2004/0267967 | A1* | 12/2004 | Sarangam et al. | 709/250 |
| 2005/0278498 | A1* | 12/2005 | Ahluwalia et al. | 711/170 |
| 2006/0069898 | A1* | 3/2006 | Patel | 711/171 |
| 2006/0072394 | A1* | 4/2006 | Blacquiere et al. | 369/47.1 |

OTHER PUBLICATIONS

Npaged_Lookaside_List, http://www.osronline.com/ddkx/kmarch/k112_1c1e.htm, Apr. 11, 2003.
Mark Russinovich, InstantDoc #7290, Inside Win2K Scalability Enhancements, Part 1, http://www.winntmag.com/Articles/Print.cfm?ArticleID=7290, Nov. 1999.

* cited by examiner

*Primary Examiner*—Reginald Bragdon
*Assistant Examiner*—Aracelis Ruiz
(74) *Attorney, Agent, or Firm*—Josh Cockburn

(57) ABSTRACT

Memory allocation requests are satisfied from a memory pool or from lookaside lists, based on the memory size requested to be allocated. A method, for each of a number of future differently sized memory allocations, determines which memory allocations are to be satisfied from a lookaside list, and which memory allocations are to be satisfied from a memory pool. For each memory allocation to be satisfied from a lookaside list, a corresponding lookaside list for the allocation is initialized. A table is constructed that has a number of entries corresponding to all the differently sized memory allocations. Each entry corresponding to a memory allocation to be satisfied from a lookaside list points to the lookaside list for that memory allocation.

12 Claims, 6 Drawing Sheets

SATISFYING MEMORY ALLOCATION REQUESTS FROM MEMORY POOL OR LOOKASIDE LISTS BASED ON MEMORY SIZE REQUESTED TO BE ALLOCATED

FIELD OF THE INVENTION

The present invention relates generally to satisfying memory allocation requests, such as requests generated by device drivers, and more particularly to satisfying such memory allocation requests from either a general memory pool or from a lookaside list.

BACKGROUND OF THE INVENTION

A computer system includes a collection of hardware and software. The hardware for a computer system can include such diverse hardware as video cards, storage devices like hard disk drives, input devices like keyboards and pointing devices, and so on. The software for a computer system can include an operating system, which is the master computer program for the computer system, as well as application programs that run in the context of the operating system. The application programs typically access the hardware for a computer system through the operating system.

The operating system includes a number of software components, referred to as device drivers, which are specifically developed to communicate with particular hardware. For instance, for a number of different kinds of video cards and storage devices, there may be a number of different device drivers. The operating system passes usually standardized requests for communication with the hardware to the device drivers. In turn, the device drivers translate those requests into the specific manner by which their corresponding hardware expects to receive communication.

Device drivers, as well as the other software of a computer system, usually need to store some data within the memory of the computer system. A device driver therefore allocates needed memory through the operating system, and the operating system sets aside this memory for use by the device driver. When the device driver is finished using the memory that has been allocated to it, the driver sends a notice to the operating system. The operating system in turn allows this memory to be freed, so that it can be allocated for other software of the computer system as needed.

Versions of the Microsoft® Windows® operating system, available from Microsoft Corp., of Redmond, Wash., as well as versions of other operating systems, allow device drivers and other software to allocate memory in at least two different ways. First, a device driver may when initialized request that blocks of memory be set aside for its future use, where these blocks of memory are each a multiple of a same size of memory that will be later requested by the driver. Such blocks of memory are referred to herein as lookaside lists.

For example, a device driver may request that ten or more entries, each sixteen bytes in size, be set aside. The collection of these entries is referred to as a lookaside list. Importantly, within a given lookaside list, each entry has the same size. When the device driver later needs to use memory of this size, it requests that the operating system return it a pointer to an unused entry within the list. When the driver is finished using the memory, it notifies the operating system that the entry can be again denoted as being unused.

Second, a device driver may dynamically while it is running request that memory of any desired size be allocated from a memory pool. The memory pool is a collection of currently unused memory throughout the computer system. When fielding a request for memory of a given size from the memory pool, the operating system examines what memory is available within the pool, and returns to the driver a description of where to find this memory, such as a pointer to the memory. The operating system may have to collect a number of discontiguous memory segments in order to satisfy the given size of a memory request.

Lookaside lists have the advantage of satisfying memory requests from device drivers quickly. This is because the memory of a lookaside list has already been set aside by the operating system. The operating system therefore simply has to return to a device driver a pointer to an unused entry within the list. Disadvantageously, however, lookaside lists require that memory be set aside when the driver is initialized, regardless of whether the driver will actually use the memory. The driver must, therefore, a priori determine what types of lookaside lists it will require in the future.

Furthermore, a lookaside list can only be used to satisfy more requests requesting an amount of memory equal to or less than the size of each entry of the list. Using a lookaside list with entries sixteen bytes in size, for example, can be used to satisfy requests for memory no greater than sixteen bytes. Additionally, if such a lookaside list is used to satisfy a memory request less than sixteen bytes in size, sixteen bytes will nevertheless be allocated, wasting one or more bytes of memory.

Satisfying memory allocations from the general memory pool of a computer system has the advantage of being able to field memory requests of any size. Because memory is not allocated in this way until a memory request has been received, no memory is wasted by being set initially aside, and the exact amount of memory requested can be allocated. Disadvantageously, however, the operating system may exact a performance penalty by having to locate sufficient free memory, even if segmented, to satisfy a particular memory request.

Therefore, both ways of satisfying memory allocation requests have their uses. A device driver knowing that it will likely be requesting the same amount of memory a number of times should initiate a lookaside list for this amount of memory. For other memory needs, however, the device driver may allocate memory from the memory pool, especially for amounts of memory that have sizes that are not likely to be repeatedly requested by the driver.

A disadvantage with current operating systems, such as versions of the Microsoft® Windows® operating system, is that the developer of a device driver has to hard code into the driver the ways in which the device driver will allocate different sizes of memory. For example, the operating system may provide one type of call to allocate memory using a lookaside list, and another type of call to allocate memory from the memory pool. The developer of a device driver must therefore employ the appropriate type of call to allocate memory in the desired manner.

What this means is that if the developer later decides that a certain kind of memory allocation would be best handled by a lookaside list instead of from the memory pool, or vice-versa, he or she has to recode and recompile the device driver. Many times the developer will want to test the performance of a device driver to determine whether a lookaside list or the memory pool is the best source for a given memory allocation. Therefore, the developer may have to recode and recompile the device driver many times in order to maximize driver performance. Even then, performance can vary depending on the specific computer system on which the device driver is run, and there is no easy way to tune memory allocations by a driver once it has been dispatched into the field.

Furthermore, using more than one lookaside list, where each lookaside list is dedicated to satisfying memory allocation requests of a particular size or amount, also requires undue developer attention. When allocating memory using a lookaside list, a device driver usually has to specify the specific lookaside list from which the memory is to be allocated. If the wrong lookaside list is specified, either too much memory will be allocated, or more seriously, insufficient memory will be allocated, which can cause the computer system to crash.

For these and other reasons, therefore, there is a need for the present invention.

SUMMARY OF THE INVENTION

The present invention relates to satisfying memory allocation requests from a memory pool or from lookaside lists, based on the memory size requested to be allocated. A method of the invention, for each of a number of future differently sized memory allocations, determines which memory allocations are to be satisfied from a lookaside list, and which memory allocations are to be satisfied from a memory pool. For each memory allocation to be satisfied from a lookaside list, a corresponding lookaside list for the memory allocation is initialized. A table is then constructed that has a number of entries corresponding to all the differently sized memory allocations corresponding to memory allocation requests to be satisfied from lookaside lists, each of which points to the lookaside list for a corresponding size of memory allocation. In one embodiment, there are also entries corresponding to all the differently sized memory allocations corresponding to memory allocation requests to be satisfied from the memory pool, each of which has or contains a selected value, such as NULL, indicating that this memory allocation is to be satisfied from the memory pool.

Therefore, when a request to allocate memory of a given size is received, the size of the memory request is looked up within the table. If the entry of the table corresponding to this size points to a lookaside list, the memory request is satisfied by returning a pointer to an unused entry of the table. Otherwise, the memory is allocated from the memory pool, and a pointer to this memory is returned. It is noted in one embodiment, that the table may actually include or encompass two tables: a first table for memory allocations relating to paged memory, and a second table for memory allocations relating to non-paged memory.

A computing system of the invention includes one or more processors, memory, and a computer program. The memory stores a number of lookaside lists, where each lookaside list corresponds to a differently sized memory allocation to be satisfied therefrom. The memory further stores a pool of memory, and a table having a number of entries. Each table entry maps a differently sized memory allocation to one of the lookaside lists, and, in one embodiment, alternatively contains a value indicating that the pool of memory should satisfy the memory allocation. The computer program is executed by the processors. The program receives memory requests to allocate memory, and looks up sizes of the requests within the table to determine whether to allocate the memory from the lookaside lists or from the pool of memory.

An article of manufacture of the invention includes a computer-readable medium and-means in the medium. The computer-readable medium may be a recordable data storage medium, a modulated carrier signal, or another type of computer-readable medium. The means is for looking up an entry of a given size of a request to allocate memory within a table having entries corresponding to differently sized memory allocations. The means is also for returning a pointer to an unused entry within a lookaside list corresponding to the given size where the entry of the table points to the lookaside list. The means is further for allocating memory of the given size from a memory pool where the entry of the table has a selected value indicating that the memory allocation to which the entry corresponds is to be satisfied from the pool, and for returning a pointer to the memory allocated.

Embodiments of the invention provide for advantages over the prior art. A device driver, for example, may indicate at runtime that certain future memory allocation requests are to be satisfied using corresponding lookaside lists, and that other memory allocation requests are to be satisfied from the memory pool. In response, the invention constructs a table having entries corresponding to these differently sized requests, where each entry either points to an initialized lookaside list for its corresponding size of request, or in one particular embodiment contains a selected value indicating that its corresponding size of request is to be satisfied from the memory pool. When the device driver later allocates memory, it submits a general memory allocation request, specifying a particular size of memory to be allocated. Based on this size of memory to be allocated, the invention then either allocates the memory from a corresponding lookaside list or from the memory pool, depending on how the table was earlier constructed.

Therefore, unlike in the prior art, the device driver does not have to track which memory allocation requests are to be satisfied from lookaside lists, and which requests are to be satisfied from the memory pool. That is, the developer of a device driver does not have to hard code particular types of memory allocation requests depending on whether the memory to be allocated is from a lookaside list or from the memory pool. Rather, the developer only need to specify at the outset which sizes of memory allocations are to be satisfied from a lookaside list and which sizes are to be satisfied from the memory pool, and the invention takes care of the rest. Furthermore, with respect to memory allocation requests to be satisfied from lookaside lists, the device driver does not have to track which requests are to be satisfied from which lookaside lists. Rather, the invention ensures that the appropriate lookaside list is used for a given memory allocation request.

In addition, the present invention can allow the developer of a device driver to tune the performance of memory allocation by a device driver without having to recode and recompile the driver. For example, the manner by which differently sized memory allocation requests are to be satisfied from lookaside lists and the memory pool may be specified within configuration information for the driver. Such configuration information may be stored as a file on the computer system, or within a central repository for such information as provided by the operating system of the computer system, such as the registry in the context of versions of the Microsoft® Windows® operating system. Therefore, a developer can change how memory is allocated by the device driver by simply modifying this configuration information each time before the driver is run. Furthermore, the configuration information may be able to be tuned for each computer system on which the device driver is run, to further maximize performance.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 2 is suggested for printing on the first page of the patent.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
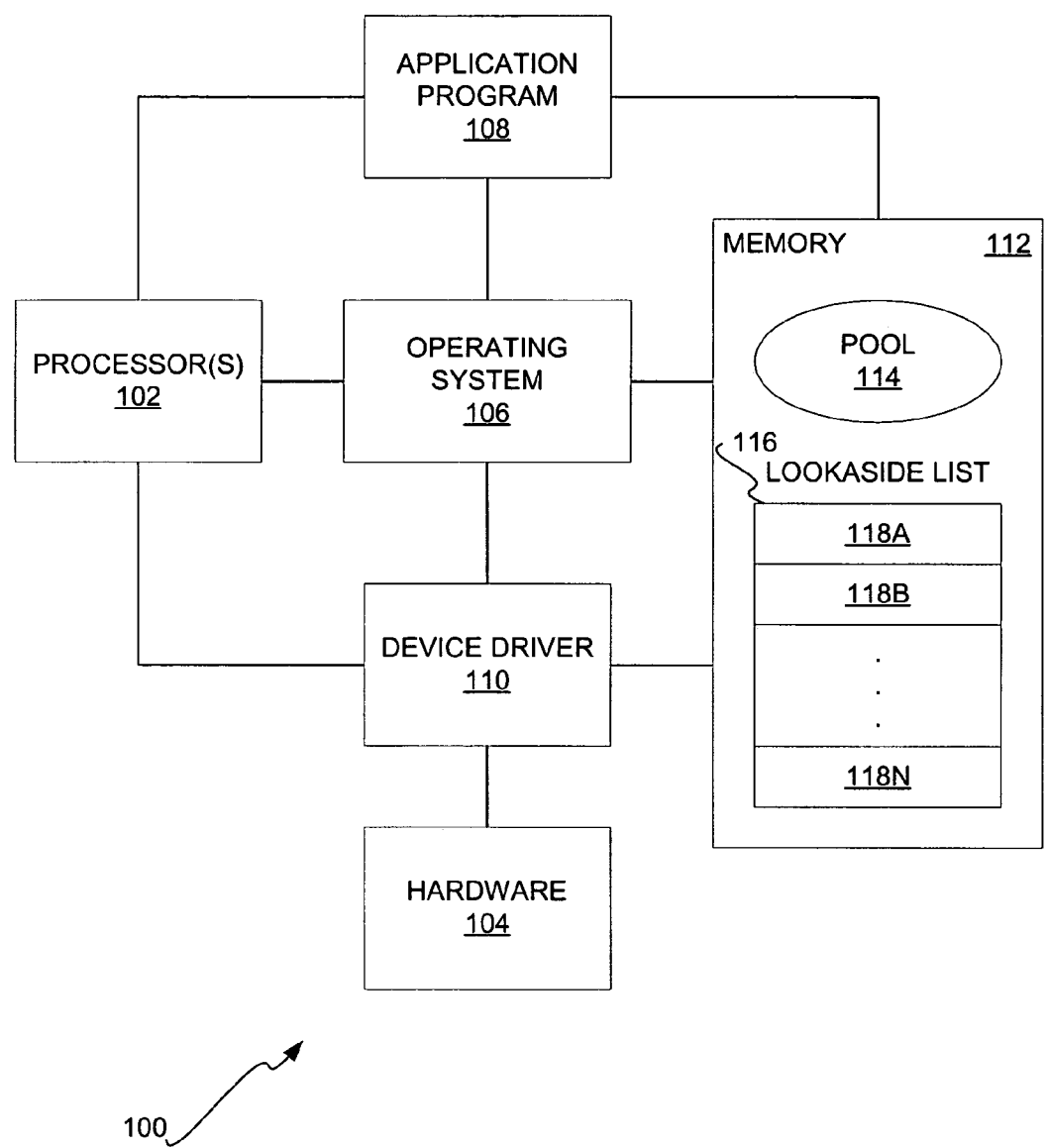
FIG. 1 is a diagram of a rudimentary computer system, according to an embodiment of the invention.

FIG. 1 shows a rudimentary computer system 100, according to an embodiment of the invention. The computer system 100 is depicted in FIG. 1 as including one or more processors 102, a piece of hardware 104, and memory 112. The computer system 100 is further shown in FIG. 1 as including the following software: an operating system 106, an application program 108, and a device driver 110. As can be appreciated by those of ordinary skill within the art, the computer system 100 may include other software and/or hardware components, in addition to and/or in lieu of those depicted in FIG. 1.

The processors 102 are the hardware that execute the operating system 106, the application program 108, and the device driver 110. The operating system 106 is the master control program that runs the computer system 100. It is typically the first program loaded when the computer system is turned on. The operating system 106 sets the standards for all application programs, such as the application program 108, that run on the computer system 100. The application program 108 is a program that has specific functionality, and that communicates with the operating system 106 for user interface, file management, and other operations.

The operating system 106 itself interfaces with the hardware 104 through the device driver 110. One specific piece of hardware 104, having the corresponding device driver 110, is shown in FIG. 1 for illustrative clarity, and in actuality there is usually a number of pieces of hardware, with corresponding device drivers. The hardware 104 may be a storage device, such as a hard disk drive, a video card, an input device, like a keyboard, or another type of hardware. The device driver 110 is thus a specific computer program that links the operating system 106 to the hardware 104. The device driver 110 translates the general or standardized requests by the operating system 106 into the specific command language of the hardware 104.

The memory 112 is usually dynamic-random access memory (DRAM), or another type of volatile storage, that is employed by the software within the computer system 100 to temporarily store data. As such, the operating system 106, the application program 108, and the device driver 110 all are communicatively coupled to the memory 112 in some manner. The operating system 106 specifically tracks the memory 112 that is in use and which of the memory 112 is available for allocation to the software of the system 100. Thus, the application program 108 and the device driver 110 request memory through the operating system 106, and the operating system 106 in response returns a description of the memory that the requesting software can use, such as a pointer to a portion of the memory 112.

The memory 112 therefore includes a general memory pool 114. The general memory pool 114 encompasses all of the memory 112 that is not currently allocated by any software within the system 100. The memory pool 114 may not be, and typically is not, a contiguous block of memory having a continuous set of memory addresses. Rather, once the computer system 100 has been running a while, the memory pool 114 may include a large number of small discontiguous segments of memory. When the operating system 106 receives a memory allocation request for a particular size of memory from the memory pool 114, it may first try to find a contiguous block of memory within the memory pool 114 to allocate. Failing that, the operating system 106 attempts to piece together sufficient discontiguous segments of memory within the memory pool 114 to satisfy the request.

The memory 112 is also depicted in FIG. 1 as including a particular type of data structure, a lookaside list 116, which can be used to satisfy memory requests, especially from the device driver 110. The lookaside list 116 is a block of memory within the memory 112 that is preferably but not necessarily contiguous, and which is allocated by the device driver 110 in one embodiment when the device driver 110 is first executed or loaded, at runtime. That is, the device driver 10 requests that the operating system 106 set aside for its later use a block of memory referred to as the lookaside list 116. No specific connotation of the terms "lookaside" and "list" is intended herein except as to the specific functionality described in relation to the lookaside list 116.

The lookaside list 116 has a number of entries 118A, 118B, ..., 118N, which are collectively referred to as the entries 118. The entries 118 each have the same size, such as the same number of bytes. The device driver 110 therefore requests that the lookaside list 116 be initialized by the operating system 106 as having a particular number of the entries 118, with each entry having the same particular size. In response, the operating system 106 allocates this data structure. Subsequently, when the device driver 110 needs an amount of memory equal to or less than the size of one of the entries 118, it can request that amount of memory from the operating system 106. The operating system 106 returns to the device driver 110 a pointer to one of the entries 118 of the lookaside list 116 in satisfying the memory allocation request of the driver 110.

In one embodiment of the invention, the memory 112 may itself be divided into two or more different types of memory, where each memory type has an associated memory pool, lookaside lists can be allocated from either memory type. For instance, the memory 112 may include paged and non-paged memory. Paged memory is memory that the contents of which may be swapped to and from a non-volatile storage device, typically a hard disk drive, when needed. For example, more paged memory may be required to store all the needed data than is present, such that as data is needed, it is swapped from and to the non-volatile storage device. Non-paged memory, by comparison, is memory that the contents of which are not allowed to be swapped to and from a non-volatile storage device. Rather, the contents of non-paged memory is always stored within the non-paged memory.

Figure 2:
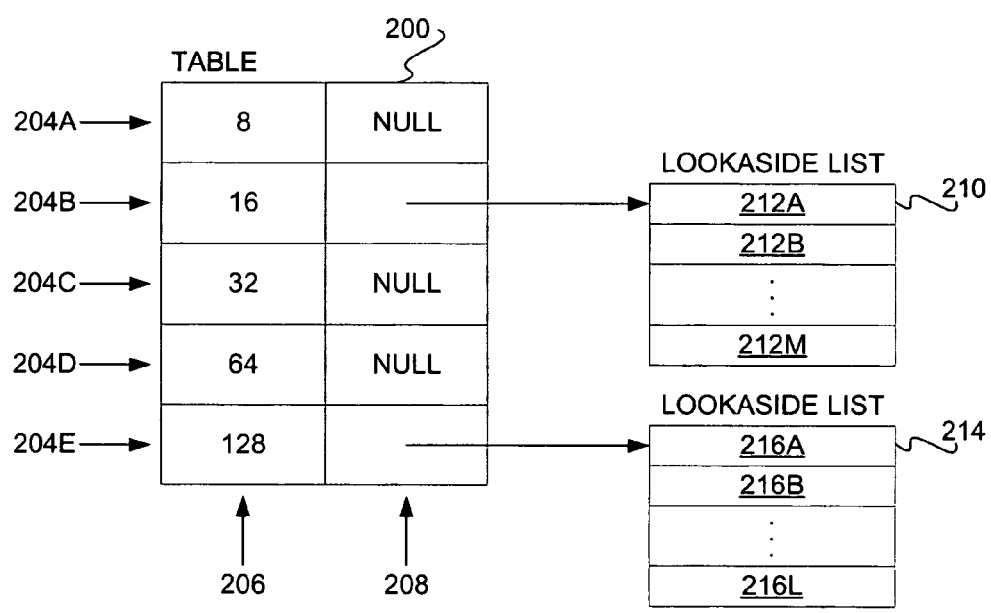
FIG. 2 is a diagram of a table having entries corresponding to differently sized memory allocations, each entry either pointing to a corresponding lookaside look or containing a value indicating that its sized memory allocation is to be satisfied from a memory pool, according to an embodiment of the invention.

FIG. 2 shows how a table 200 can be used to satisfy memory allocation requests from either the memory pool 114 or a lookaside list, according to an embodiment of the invention. The table 200 is depicted in the example of FIG. 2 as having a number of entries 204A, 204B, 204C, 204D, and 204E, collectively referred to as the entries 204. Where the memory 112 is divided into two or more types of different memory, such as paged and non-paged memory, the table 200 may itself include a table for each different type of memory. Each of the entries 204 has values in a first column 206 and a second column 208. The first column 206 specifies the size, or amount, of the memory allocation to which an entry of the table 200 corresponds. For instance, the entry 204A corresponds to memory allocations for eight bytes of memory, the entry 204B corresponds to memory allocations for sixteen bytes of memory, and so on.

The second column 208 specifies one of two things. First, if an entry of the table 200 contains or has a selected value in the second column 208, which is specified as NULL in FIG. 2, then this means that memory allocations for the size of memory specified in the first column 206 of the entry are to be satisfied from the memory pool 114. For example, memory allocation requests for eight bytes of memory are satisfied from the memory pool 114, because the entry 204A that has the value of eight bytes in the column 206 contains the selected value NULL in the column 208.

Second, if an entry of the table 200 points to a lookaside list in the second column 208, then this means that memory allocations for the size of memory specified in the first column 206 of the entry are to be satisfied with an unused entry from the lookaside list to which the entry points in the second column 208. For example, memory allocation requests for sixteen bytes of memory are satisfied from the lookaside list 210, because the entry 204B that has the value of sixteen bytes in the column 206 contains a pointer to the lookaside list 210 in the column 208. Therefore, such memory allocation requests are satisfied by returning a pointer to an unused one of the entries 212A, 212B, ..., 212M of the lookaside list 210.

As a further example, memory allocation requests for 32 or 64 bytes of memory are satisfied from the memory pool 114, because the entries 204C and 204D referencing 32 and 64 byte memory allocations contain the selected value NULL. By comparison, memory allocation requests for 128 bytes of memory are satisfied from the lookaside list 214, because the entry 204E that references 128 byte memory allocations contains a pointer to the lookaside list 214. Therefore, such 128 byte memory allocations are satisfied by returning a pointer to an unused one of the entries 216A, 216B, ..., 216L of the lookaside list 214.

The table 200 and the lookaside lists 210 and 214 may have been initialized at the request of the device driver 110, at runtime of the driver 110. As such, the device driver 110 specifies the sizes of memory allocation requests that it will later be making, and the table 200 with appropriate entries 204 is constructed. In the example of FIG. 2, the driver 110 would have specified that it will be later making memory allocation requests for memory of either eight, sixteen, 32, 64, or 128 bytes in size. The device driver 110 further specifies how each differently sized memory allocation request is to be satisfied. In the example of FIG. 2, the driver 110 would have specified that memory allocation requests for memory of either sixteen or 128 bytes in size are to be satisfied from lookaside lists, and that requests for memory of eight, 32, or 64 bytes are to be satisfied from the memory pool 114.

In response, the entries 204A, 204C, and 204D are populated with the selected value, such as NULL, that indicates that their sized memory allocation requests are to be satisfied from the memory pool 114. Furthermore, the lookaside lists 210 and 214 are created, and the entries 204B and 204E are populated with pointers to the lists 210 and 214, respectively. Each of the entries 212 of the lookaside list 210 is sixteen bytes in size, whereas each of the entries 216 of the lookaside list 214 is 128 bytes in size. The number of the entries 212 within the list 210 and the number of the entries 216 within the list 214 may be specified by the device driver as well in one particular embodiment, and the number of entries 212 may be the same or different than the number of entries 216.

When a memory allocation request is subsequently received from the device driver 110, the entry of the table 200 corresponding to the size of the request is examined to determine how to satisfy the request. If the size or amount of the memory requested is eight bytes, 32 bytes, or 64 bytes, then the entries 204A, 204C, and 204D, respectively, are looked up. Because these entries contain the selected value NULL, such memory requests are satisfied by allocating memory from the memory pool 114. By comparison, if the size or amount of the memory requested is sixteen bytes or 128 bytes, then the entries 204B and 204E are looked up. Because the entries 204B and 204E contain pointers to lookaside lists 210 and 214, respectively, such requests are satisfied by returning a pointer to an unused entry within one of the lists 210 and 214 as appropriate.

Furthermore, in another embodiment of the invention, the table 200 only includes those entries that point to lookaside lists. That is, the table 200 in this embodiment would only include the entries 204B and 204E. When the table 200 is examined for a particular size of memory allocation request, if a corresponding entry is found in the table 200, then the associated lookaside list is employed to satisfy the request. Otherwise, the memory allocation request is satisfied from the general pool 114.

It is noted that the sizes of the memory allocations as specified in the table 200 is not limited by embodiments of the invention. Thus, in one embodiment the sizes of the memory allocations are different powers of two, such as eight, sixteen, 32, 64, and 128. In another embodiment, they may be multiples of eight, such as eight, sixteen, 24, 32, 48, and so on. In other embodiments, the sizes of the memory allocations may be different powers or multiples of other values, besides eight, or may be arbitrary sizes.

Figure 3:
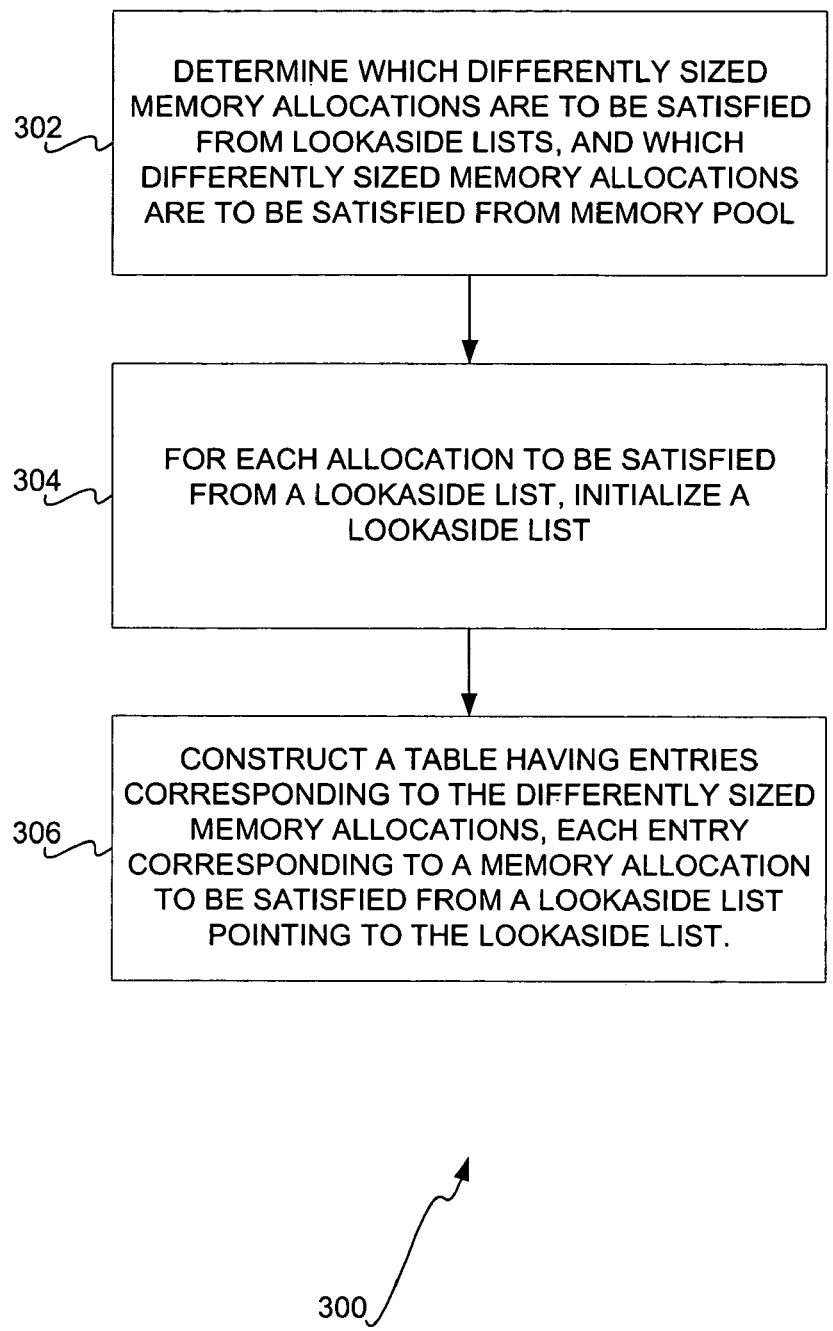
FIG. 3 is a flowchart of a method for initializing and constructing a table having entries corresponding to differently sized memory allocations, which is performed before any memory allocation is requested, according to an embodiment of the invention.

FIG. 3 shows a method 300 for constructing the table 200, according to an embodiment of the invention. The method 300 may be performed by the operating system 106 of the computer system 100 in one embodiment of the invention, or by another computer program. First, the method 300 determines which differently sized memory allocations are to be satisfied from lookaside lists, and which are to be satisfied from the memory pool 114 (302). For example, an array may be received that contains a number of memory allocation sizes to be satisfied by lookaside lists, as well as optionally the number of entries to be reserved for each such list. By receiving this array, the method 300 is able to determine that only the memory allocation sizes specified in the array are to be satisfied by lookaside lists, and that other memory allocation sizes are to be satisfied from the memory pool 114.

In one particular embodiment, the following function call may be employed to pass the array to the method 300:

int MemLibInitialize(int n, int *p int m, int *q);

The pointer p points to an array of memory allocation sizes to be satisfied by lookaside lists within paged memory, where the array has a size n. The pointer q points to an array of memory allocation sizes to be satisfied by lookaside lists within non-paged memory, where the array-has a size m. In this embodiment the lookaside lists are constructed as each having a same predetermined number of entries, since the number of entries within each list are not specified within the function call.

The method 300 next initializes a lookaside list for each size of memory allocation to be satisfied from a lookaside list as previously determined (304). The lookaside lists are thus created by allocating and therefore reserving memory for them. In one embodiment, the sizes of memory allocations to be satisfied from lookaside lists are first rounded up to a multiple of a selected value, such as eight bytes, and unique lookaside lists are created only for each unique multiple of this selected value. For example, memory allocations from lookaside lists may have been requested for sizes of eight, twelve, thirteen, and sixteen bytes. Because eight is a single multiple of eight without remainder, it receives its own lookaside list. However, rounded up, twelve and thirteen are each the same multiple of eight, two, as is the size sixteen. Therefore, a single lookaside list would be created for all of the sizes of twelve, thirteen, and sixteen bytes. Such an approach is beneficial where the base operating system itself, such as at least some versions of the Microsoft® Windows® operating system, only create lookaside lists with entries having lengths that are a multiple of a selected value.

Therefore, in the embodiment where lookaside lists are uniquely created only for memory allocation sizes that are multiples of a selected value, such as eight bytes, an array that is received which specifies the different sizes of memory allocations to be satisfied from lookaside lists is first parsed. Such parsing is accomplished to group together those sizes of memory allocations that rounded up are equal to the same multiple of the selected value, such that they are satisfied from the same lookaside list, and only one lookaside list is created for them. In the previous example, parsing an array specifying sizes of eight, twelve, thirteen, and sixteen bytes would result in grouping together the sizes of twelve, thirteen, and sixteen bytes as being satisfied from the same lookaside list. A separate lookaside list would be created for the size of eight bytes.

The method 300 finally creates the table 200 (306), which may include creating a table for each different type of memory, such as paged memory and non-paged memory, as has been described. The table 200 at least includes entries corresponding to memory allocation sizes to be satisfied from lookaside list. Each such entry, such as the entries 204B and 204E, contain the size of particular memory allocations, and also a pointer to the lookaside list to be utilized to satisfy requests for such memory allocations. In one embodiment, the table 200 may also include entries corresponding to memory allocation sizes to be satisfied from the memory pool 114. In this embodiment, such entries, like the entries 204A, 204C, and 204D, contain the size of particular memory allocations, and also a selected value, such as NULL, which denotes that requests for such sized memory allocations are to be satisfied from the memory pool 114.

Figure 4:
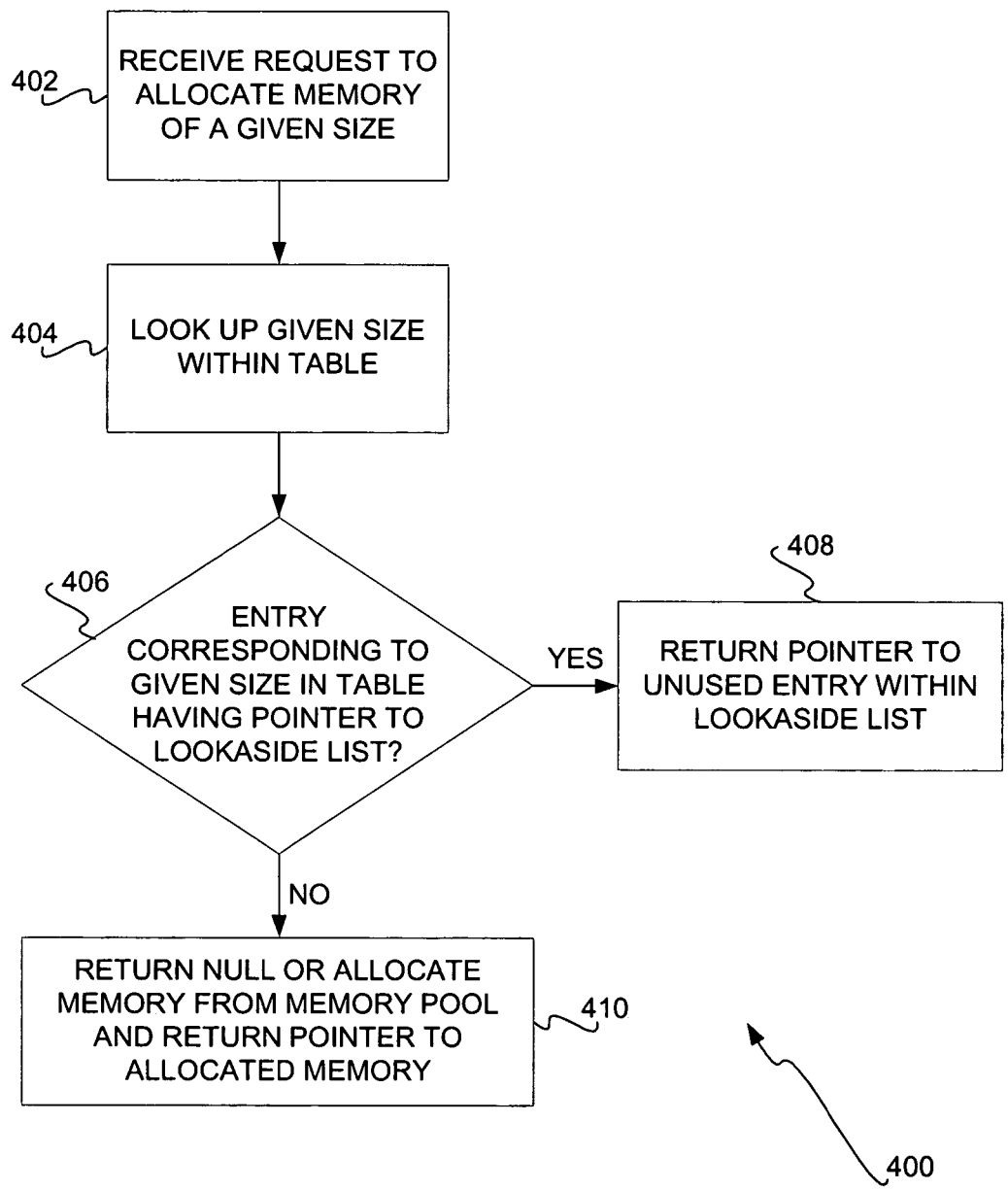
FIG. 4 is a flowchart of a method for allocating memory of a given size in response to a memory request for memory of that given size, using a table having entries corresponding to differently sized memory allocations, according to an embodiment of the invention.

FIG. 4 shows a method 400 for using the table 200 to allocate memory in response to a memory allocation request, according to an embodiment of the invention. Like the method 300, the method 400 may be performed by the operating system 106 of the computer system 100 in one embodiment, or by another computer program. First, the method 400 receives a request to allocate memory of a given size (402). In response, the method 400 looks up the size of the memory allocation request within the table 200 (404). If an entry within the table 200 is found that corresponds in size to the size of the memory allocation request and that has a pointer to a lookaside list (406), then a pointer to an unused entry within the lookaside list is returned to satisfy the memory (408).

Otherwise, the method 400 either returns a NULL value, or allocates memory from the memory pool 114 of the requested size and returns a pointer to the memory that has been allocated (410). For instance, the method 400 may have either not found an entry within the table 200 corresponding to the size of the memory allocation request. Alternatively, the method 400 may have found an entry within the table 200 that contains the selected value denoting that the memory allocation request should be satisfied from the memory pool 114. In one embodiment, the requested size of the memory allocation request is first rounded up to a multiple of a base value, such as eight bytes, prior to looking up the size in the table 200. For example, if the request is for ten bytes of memory, and the base value is eight bytes, then the requested size is rounded up to sixteen bytes prior to looking up the size in the table 200.

Furthermore, in one particular embodiment, the following function calls may be employed to make a memory allocation request to the method 400:

void *MemLibAllocatePaged(int n);
void *MemLibAllocateNPaged(int n);

The first function call is used to allocate an amount of paged memory, whereas the second function call is employed to allocate an amount of non-paged memory. With both function calls, n is the size of the memory requested to be allocated. The function calls return a pointer to the allocated entry if successful, and is NULL if unsuccessful. Thus, it is noted that the caller of the functions does not have to determine whether the memory to be allocated is from a lookaside list or from the memory pool 114. Rather, such determinations can be made by the functions themselves.

Figure 5:
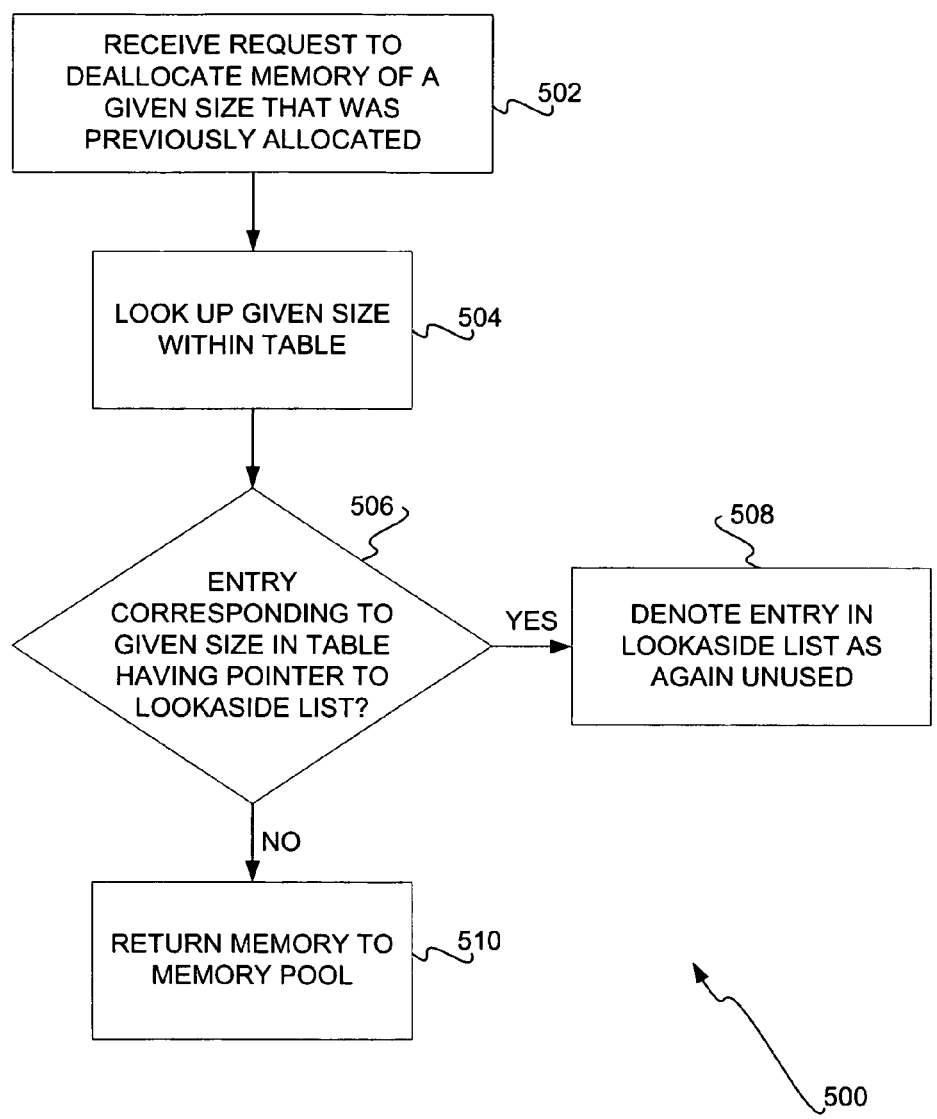
FIG. 5 is a flowchart of a method for deallocating memory of a given size in response to a notification that previously allocated memory of that size is no longer needed, using a table having entries corresponding to differently sized memory allocations, according to an embodiment of the invention.

FIG. 5 shows a method 500 for using the table 200 to deallocate memory that was previously allocated using the method 400, according to an embodiment of the invention. Like the methods 300 and 400, the method 500 may be performed by the operating system 106 of the computer system 100 in one embodiment, or by another computer-program. First, the method 500 receives a request to deallocate memory of a given size that was previously allocated (502). For instance, the device driver 110 may have previously allocated the memory, and no longer needs to use the memory.

In response, the method 500 looks up the size of the memory deallocation request within the table 200 (504). If an entry within the table 200 is found that corresponds in size to the size of the request and that has a pointer to a lookaside list (506), then the entry that was used to allocate the memory is again indicated as being an unused entry, such that it is available for future allocation (508). Otherwise, the method 500 concludes that the memory was allocated from the memory pool 114, and therefore returns the allocated memory back to the memory pool 114 for future allocation (510). In one embodiment, the size of the-memory deallocation request is first rounded up to a multiple of a base value prior to looking up the size in the table 200.

Furthermore, in one particular embodiment, the following function calls may be employed to make a memory deallocation request to the method 500:

void MemLibFreePaged(void *p, int n);
    void MemLibFreeNPaged(void *p, int n);

The first function call is used to deallocate an amount of previously allocated paged memory, whereas the second function call is employed to deallocate an amount of previously allocated non-paged memory. With both function calls, p points to the memory that has been allocated and is to be deallocated or freed, and n is the size of this amount of memory. Thus, it is noted that the caller of the functions does not have to determine whether the memory to be deallocated has been previously allocated from a lookaside list or from the memory pool 114. Rather, such a determination is made by the functions themselves.

Figure 6:
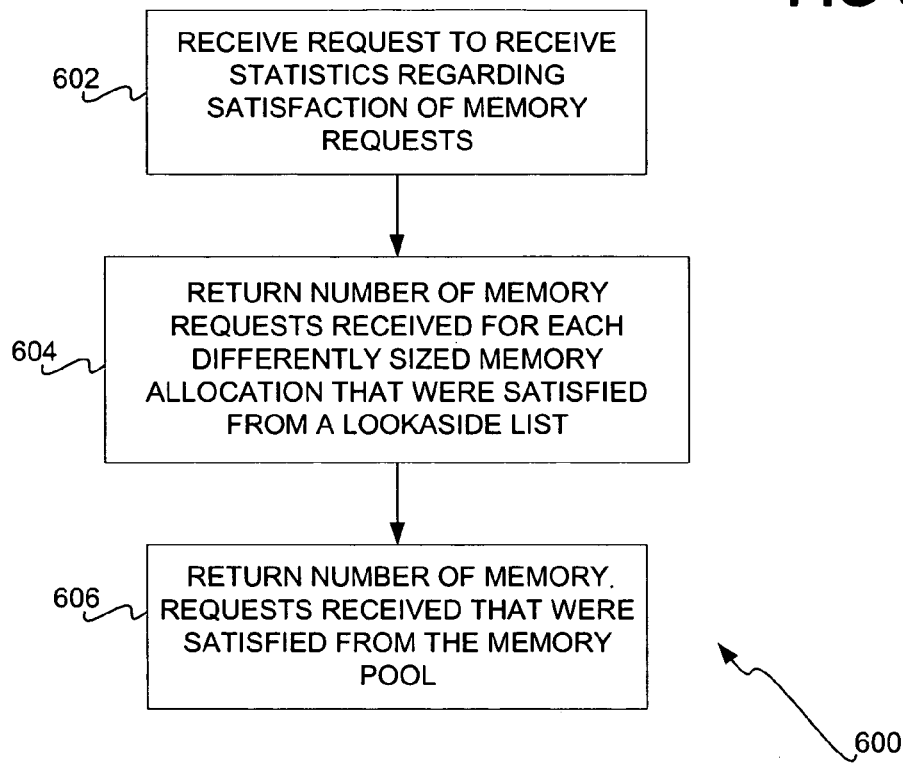
FIG. 6 is a flowchart of a method for reporting statistics regarding memory allocations made using a table having entries corresponding to differently sized memory allocations, according to an embodiment of the invention.

FIG. 6 shows a method 600 for returning statistics regarding memory allocations that have been made by looking up sizes of memory allocation requests within the table 200, according to an embodiment of the invention. As has been described, an advantage of embodiments of the invention is that the manner by which differently sized memory allocation requests are satisfied, either via lookaside lists or the memory pool 114, can be modified without having to recode and recompile the calling computer program, such as a device driver. Therefore, the method 600 can be used by the developer of the computer program, to determine whether which allocations are being satisfied by lookaside lists and which allocations are being satisfied by the memory pool 114 is appropriate.

Like the other methods, the method 600 can be performed by the operating system 106 in one embodiment, or by another computer program. First, the method 600 receives a request by a calling computer program that it wishes to receive statistics regarding the satisfaction of memory allocation requests (602). In response, the method 600 returns the number of memory allocation requests that have been received for each differently sized memory allocation and that were satisfied from a lookaside list (604). For example, in the context of the table 200 in the example of FIG. 2, the method 600 would return the number of memory allocation requests having a size of sixteen bytes that were received, and the number of requests having a size of 128 bytes that were received, since both of these types of requests are satisfied with lookaside lists.

In addition, the method 600 may return the number of memory requests that have been received that were satisfied from the memory pool 114 (606). Either the total number of such requests may be returned as a single sum, or the number may be broken down by the different sizes of the requests. For example, in the context of the table 200 in the example of FIG. 2, the method 600 may return the total number of memory allocation requests having sizes of eight, 32, or 128 bytes that were received, where requests for memory of these sizes are satisfied from the memory pool 114. Alternatively, the method 600 may return the number of requests having a size of eight bytes that were received, the number of requests having a size of 32 bytes that were received, and the number of requests having a size of 128 bytes that were received, as three separate numbers.

In one particular embodiment, the following function call may be employed to make a request to the method 600 to receive statistics:

int MemLibStatistics(int *n, int *p; int *m, int *q);

The pointers p and q point to arrays in which the function is to store the number of paged and non-paged memory allocations, respectively, that have been made for each size, where, for example, an element N of each array may correspond to sizes 8N+1 through 8N+8. Furthermore, n and m indicate the sizes of the arrays pointed to by p and q, respectively, on input, and on output, they indicate the size needed by the function to return the complete set of statistics. If a complete set of statistics is in fact returned, the function call itself returns a value of zero. If the arrays provided are too small to provide a complete set of statistics, however, then the function call returns a non-zero value. A counter associated with each entry of the table 200 may thus be incremented when an allocation occurs, to track the number of allocations made that correspond to each entry.

Figure 7:
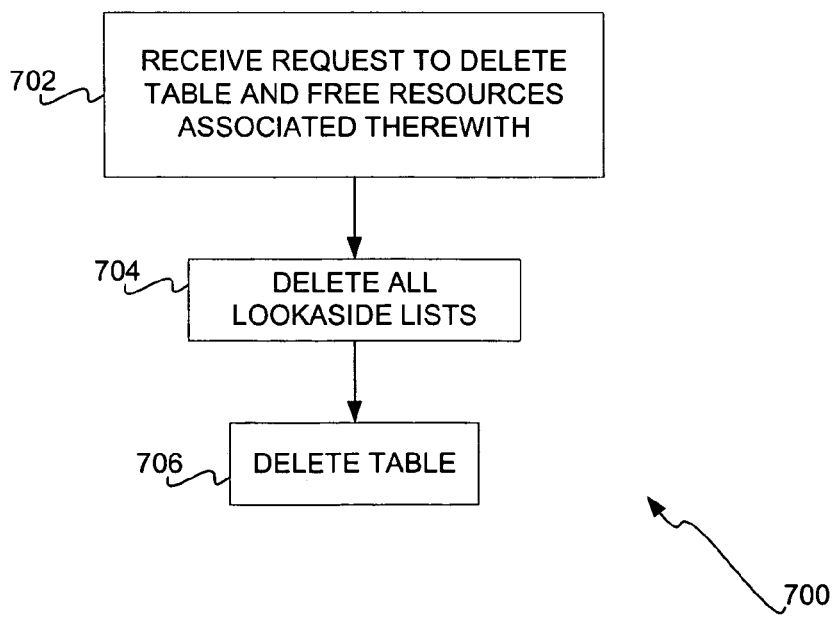
FIG. 7 is a flowchart of a method for deleting a table having entries corresponding to differently sized memory allocations, according to an embodiment of the invention.

Finally, FIG. 7 shows a method 700 for deleting the table 200 and freeing resources associated therewith, according to an embodiment of the invention. Like the other methods, the method 700 may be performed by the operating system 106 in one embodiment, or by another computer program. First, the method 700 receives a request to delete the table 200 and free resources associated with the table 200 (702). In response, the method 700 deletes all the lookaside lists that correspond to entries of the table 200 (704), freeing the memory used by the lookaside lists. The method 700 also deletes the table 200 itself (706), freeing the memory used by the table 200.

In one particular embodiment, the following function call may be employed to request to the method 700 that the table 200 be deleted and that resources associated therewith be freed or deallocated:

void MemLibDelete( );

After receiving a call to this function call in 702, for instance, the method 700 subsequently performs 704 and 706 in response.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For instance, whereas embodiments of the invention have been largely described in relation to device drivers, other embodiments are amenable to implementation in relation to other types of computer programs that allocate memory from both lookaside lists and a memory pool. Therefore, it is manifestly intended that this invention be limited only by the claims and equivalents thereof.

We claim:

1. A method comprising:
   for each of a plurality of future differently sized memory allocations, determining which of the differently sized memory allocations are to be satisfied from lookaside lists, and which of the differently sized memory allocations are to be satisfied from a memory pool;
   for each differently sized memory allocation to be satisfied from a lookaside list, initializing a lookaside list for the differently sized memory allocation; and,
   constructing a table having a plurality of entries corresponding to the differently sized memory allocations to be satisfied from a lookaside list, each entry pointing to the lookaside list for a differently sized memory allocation,
   wherein constructing the table having the plurality of entries corresponding to the differently sized memory allocations comprises constructing a first table having a plurality of entries corresponding to those of the differently sized memory allocations relating to paged memory and constructing a second table having a plurality of entries corresponding to those of the differently sized memory allocations relating to non-paged memory.

2. The method of claim 1, wherein the table further has a plurality of entries corresponding to the differently sized memory allocations to be satisfied from the memory pool, each entry having a selected value indicating that a differently sized memory allocation is to be satisfied from the memory pool.

3. The method of claim 1, wherein determining which of the differently sized memory allocations are to be satisfied from a lookaside list, and which of the differently sized memory allocations are to be satisfied from the memory pool comprises receiving an array of differently sized memory allocations to be satisfied from lookaside lists.

4. The method of claim 3, wherein each differently sized memory allocation of the array has a size, and the array is parsed to group together as being satisfied from a same lookaside list those of the differently sized memory allocations of the array having sizes that rounded up to a multiple of a base value are equal to a same multiple of the base value.

5. The method of claim 1, wherein each entry corresponding to a differently sized memory allocation to be satisfied from the memory pool has a NULL pointer as the selected value indicating that the differently sized memory allocation is to be satisfied from the memory pool.

6. The method of claim 1, further comprising:
   receiving a request to allocate memory of a given size;
   looking up the given size of the request within the table;
   where the entry of the table corresponding to the given size of the request points to a lookaside list, returning a pointer to an unused entry of the lookaside list to satisfy the request; and,
   otherwise, allocating the memory of the given size from the memory pool.

7. The method of claim 6, wherein looking up the given size of the request within the table comprises rounding up the given size to a multiple of a base value, such that the given size as rounded up to the multiple of the base value is looked up in the table.

8. The method of claim 1, further comprising:
   receiving a request to deallocate memory of a given size that was previously allocated;
   looking up the given size of the request within the table;
   where the entry of the table corresponding to the given size of the request points to a lookaside list, denoting that an entry of the lookaside list that was used to allocate the memory of the given size is now unused and available for future allocation; and,
   otherwise, concluding that the memory of the given size was allocated from the memory pool and returning the memory of the given size to the memory pool for future allocation.

9. The method of claim 8, wherein looking up the given size of the request within the table comprises rounding up the given size to a multiple of a base value, such that the given size as rounded up to the multiple of the base value is looked up in the table.

10. The method of claim 1, further comprising:
    receiving a request to delete the table and free resources associated therewith;
    deleting the lookaside list for each differently sized memory allocation that was previously initialized; and,
    deleting the table having the plurality of entries corresponding to the differently sized memory allocations.

11. The method of claim 1, further comprising:
    receiving a request to receive statistics regarding satisfaction of memory requests from the lookaside lists that were previously initialized; and,
    returning a number of memory requests received for each differently sized memory allocation that were satisfied from a lookaside list corresponding to the differently sized memory allocation.

12. The method of claim 11, further comprising returning a number of memory requests received that were satisfied from the memory pool, by memory allocation size.

* * * * *